Patented Oct. 2, 1934

1,975,387

UNITED STATES PATENT OFFICE 1,975,387

SALTS OF AMINO-ACRIDINE COMPOUNDS WITH SULPHONIC ACIDS

Louis Benda, Frankfort-on-the-Main, Germany, assignor to Winthrop Chemical Company, Inc., New York, N. Y., a corporation of New York No Drawing. Application April 20, 1932, Serial No. 606,529. In Germany May 4, 1931

7 Claims. (Cl. 260—36)

The present invention relates to salts of aminoacridine compounds with sulphonic acids.

The hitherto known acridine compounds which are soluble in fatty oils, for instance the salts obtainable by combining acridine compounds with aromatic carboxylic acids, are nearly insoluble in essential oils.

Now I have found that products which are easily soluble in essential oils are obtained by combining aminoacridine compounds with a sulphonic acid of the following general formula

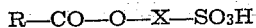

wherein R stands for the radical of a high molecular aliphatic hydrocarbon and X stands for a hydrocarbon radical containing two or three carbon atoms. The term "high molecular acid" is intended to comprise acids containing at least 4 carbon atoms, preferably those containing 12 to 18 carbon atoms. Among the amino-acridine compounds there may be used compounds containing a trivalent or a pentavalent nuclear nitrogen atom, for instance 3.6-diaminoacridine compounds or 3,6-diamino-10-methylacridinium compounds. As sulphonic acids suitable for the preparation of the acridinium salts there may be mentioned the compounds described in U. S. Patent No. 1,881,172, in the name of Karl Daimler and Karl Platz, for instance, the oleic-, lauric-, stearic-, and ricinoleic acid esters of hydroxyethanesulphonic acid.

The new compounds thus obtained constitute preparations which are very well tolerated and are particularly suitable for treating gonorrhea and other infections. They distinguish themselves from the salts obtainable by combining acridine compounds with aromatic carboxylic acids in that they are much more easily soluble in essential oils than the known salts; solutions of 25% strength of the new compounds in oleum santali, caraway oil, oleum caryophylli etc. can easily be prepared. This is considerably important in practice, since for saving the stomach, for instance, solutions of oleum santali must be administered in hardened gelatine capsules which are only soluble in the small intestine and, therefore, must have only a small volume; it is therefore necessary, as in many other cases, to use solutions in as concentrated a condition as possible.

The following examples illustrate the invention.

(1) 5 parts of 3.6-diamino-10-methylacridinium chloride are dissolved in 150 parts of hot water and the solution is mixed at about 70° C. with a solution in 160 cc. of water of 16 grams of a paste of 60% strength of the sodium salt of the oleic acid ester of alpha-hydroxyethanebetasulphonic acid of the formula

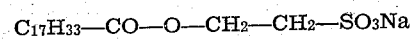

prepared according to Example 1 of the above mentioned U. S. Patent No. 1,881,172. The new compound separates in a resinous form. It is several times kneaded with hot water and dried in a vacuum. It forms an orange waxy mass which is sparingly soluble in hot water and hot acetone, rather soluble in hot alcohol and benzene and easily soluble in chloroform and essential oils. The product has the following probable formula:

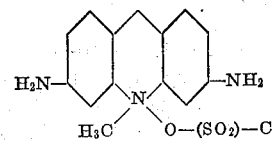

(2) 5 grams of 2-ethoxy-6,9-diaminoacridine chloride are dissolved in 150 cc. of boiling water and the solution is mixed at about 70° C. with a filtered solution of 13 grams of the paste described in Example 1 in 130 cc. of water.

A yellow precipitate is obtained which is filtered. It is then made into a paste with 100 cc. of hot water, the aqueous liquid is poured off and the residue is dried.

A brownish-yellow, semi-solid product is obtained which is sparingly soluble in water, soluble in hot acetone, rather soluble in alcohol and hot benzene and easily soluble in chloroform and essential oils. The product has the following probable formula:

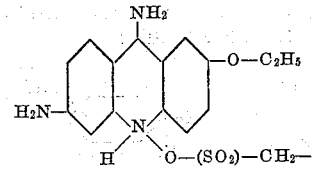

(3) 7.8 parts of 3.6-diamino-10-methylacridinium chloride are dissolved in 225 parts of hot water and the solution is mixed at about 70° C.–80° C. with a filtered solution of 16.5 parts of the sodium salt of the lauric acid ester of alpha-hydroxyethane-beta-sulphonic acid of the following formula:

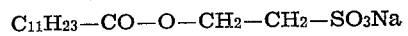

in 180 parts of water. The new compound separates in a resinous form; it is kneaded several times with hot water and dried in a vacuum. It forms a wax-like, reddish-orange mass which is sparingly soluble in hot water and hot acetone. The substance rather readily dissolves in hot benzene, somewhat better in alcohol and easily in chloroform and essential oils. The product has the following probable formula:

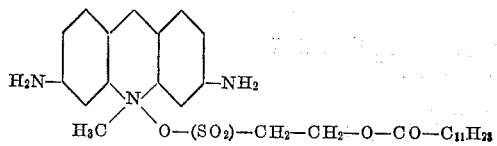

(4) 7.8 parts of 3,6-diamino-10-methylacridinium chloride are dissolved in 225 parts of hot water and the solution is mixed at about 80° C. with a filtered solution of 20.4 parts of the sodium salt of the stearic acid ester of alpha-hydroxyethanebetasulphonic acid of the following formula:

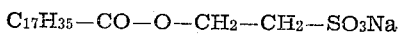

$C_{17}H_{35}$—CO—O—CH$_2$—CH$_2$—SO$_3$Na in 400 parts of water. The new compound separates in a resinous form; it is kneaded several times with hot water and then dried in a vacuum. It forms a red-orange powder which is sparingly soluble in hot water, difficultly soluble in hot acetone, rather readily soluble in benzene and alcohol and easily soluble in chloroform and essential oils. The product has the following probable formula:

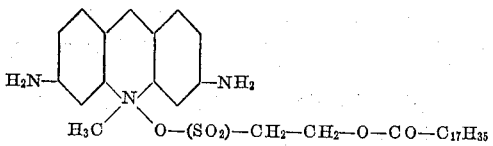

(5) 2.6 parts of 3,6-diamino-10-methylacridinium chloride are dissolved in 60 parts of hot water and the solution is mixed with a solution of 11 parts of the sodium salt of the oleic acid ester of gamma-cresoxy-beta-hydroxypropane-alpha-sulphonic acid of the following formula:

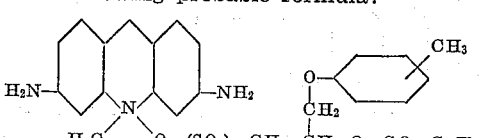

in 120 parts of hot water. The new compound separates in a resinous form; it is kneaded several times with hot water and then dried in a vacuum. It forms a dark red mass which is not quite solid, sparingly soluble in hot water, difficultly soluble in hot acetone, rather easily soluble in hot alcohol and benzene and easily soluble in chloroform and essential oils. The product has the following probable formula:

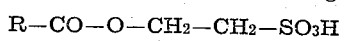

(6) 5 parts of 3,6-diaminoacridine chloride are dissolved in 150 parts of hot water and this solution is mixed at about 80° C. with a solution of 12.4 parts of the sodium salt of the stearic acid ester of alpha-hydroxyethanebetasulphonic acid in 240 parts of water. The resultant body which is only slightly resinous is separated from the mother liquor, washed several times with water, while triturating, and dried in a vacuum. The new compound forms a reddish-yellow powder which sparingly dissolves in hot water, difficultly dissolves in hot acetone, rather easily dissolves in hot benzene and alcohol and easily dissolves in chloroform and essential oils. The product has the following probable formula:

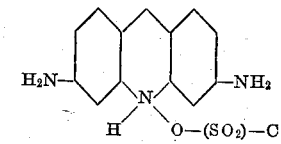

I claim:

1. The salts of an aminoacridine compound with a sulphonic acid of the following formula

R—CO—O—X—SO$_3$H wherein R stands for the radical of a high molecular aliphatic hydrocarbon and X stands for a hydrocarbon radical, containing two or three carbon atoms, said products being easily soluble in essential oils and chloroform and sparingly soluble in water.

2. The salts of an aminoacridine compound with a sulphonic acid of the following formula

R—CO—O—CH$_2$—CH$_2$—SO$_3$H wherein R stands for the radical of a high molecular aliphatic hydrocarbon, said products being easily soluble in essential oils and chloroform and sparingly soluble in water.

3. The 3,6-diamino-10-methylacridinium salt of oleic acid ester of alpha-hydroxyethane-beta-sulphonic acid, said product being easily soluble in essential oils and chloroform and sparingly soluble in water.

4. The 3,6-diamino-10-methylacridinium salt of lauric acid ester of alpha-hydroxyethane-beta-sulphonic acid, said product being easily soluble in essential oils and chloroform and sparingly soluble in water.

5. The 3,6-diamino-10-methylacridinium salt of stearic acid ester of alpha-hydroxyethane-beta-sulphonic acid, said product being easily soluble in essential oils and chloroform and sparingly soluble in water.

6. The salts of a 3,6-diaminoacridine compound with a sulphonic acid of the following formula:

R—CO—O—CH$_2$—CH$_2$—SO$_3$H wherein R stands for the radical of a high molecular aliphatic hydrocarbon, said product being easily soluble in essential oils and chloroform and sparingly soluble in water.

7. The 3,6-diamino-10-methylacridinium salts of a sulphonic acid of the following formula:

R—CO—O—CH$_2$—CH$_2$—SO$_3$H wherein R stands for the radical of a high molecular aliphatic hydrocarbon, said products being easily soluble in essential oils and chloroform and sparingly soluble in water.

LOUIS BENDA.